United States Patent
Whaley et al.

(10) Patent No.: US 12,032,668 B2
(45) Date of Patent: *Jul. 9, 2024

(54) IDENTIFYING AND AUTHENTICATING USERS BASED ON PASSIVE FACTORS DETERMINED FROM SENSOR DATA

(71) Applicant: Prove Identity, Inc., New York, NY (US)

(72) Inventors: John Whaley, Fremont, CA (US); Kurt W. Somerville, Oakland, CA (US)

(73) Assignee: Prove Identity, Inc., New York, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/527,083

(22) Filed: Nov. 15, 2021

(65) Prior Publication Data

US 2022/0075856 A1 Mar. 10, 2022

Related U.S. Application Data

(63) Continuation of application No. 15/600,140, filed on May 19, 2017, now Pat. No. 11,176,231.

(Continued)

(51) Int. Cl.
*G06F 21/32* (2013.01)
*G06F 21/31* (2013.01)
(Continued)

(52) U.S. Cl.
CPC ............ *G06F 21/32* (2013.01); *G06F 21/316* (2013.01); *G06N 20/00* (2019.01);
(Continued)

(58) Field of Classification Search
CPC ... G06F 21/32; G06F 21/316; H04L 63/0853; H04L 63/102; H04L 63/1408
See application file for complete search history.

(56) References Cited

U.S. PATENT DOCUMENTS 6,049,712 A 4/2000 Wallinder
8,145,561 B1 3/2012 Zhu
(Continued)

FOREIGN PATENT DOCUMENTS

EP 1197928 4/2002
KR 20060077541 7/2006
(Continued)

OTHER PUBLICATIONS

Matsunaka et al., "Device Authentication and Registration Method Assisted by a Cellular System for User-driven Service Creation Architecture"; https://ieeexplore.ieee.org/document/478473, 2009 6th IEEE Consumer Communications and Networking Conference; Jan. 10-13, 2009, 5 pages, Doc 1849.

(Continued)

*Primary Examiner* — Jason Chiang
(74) *Attorney, Agent, or Firm* — Husch Blackwell LLP; Bryan D. Stewart

(57) ABSTRACT

The disclosed embodiments relate to a system that authenticates and/or identifies a user of an electronic device based on passive factors, which do not require conscious user actions. During operation of the system, in response to detecting a trigger event, the system collects sensor data from one or more sensors in the electronic device. Next, the system extracts a feature vector from the sensor data. The system then analyzes the feature vector to authenticate and/or identify the user, wherein the feature vector is analyzed using a model trained with sensor data previously obtained from the electronic device while the user was operating the electronic device.

20 Claims, 6 Drawing Sheets

Related U.S. Application Data

(60) Provisional application No. 62/338,663, filed on May 19, 2016.

(51) Int. Cl.
    *G06N 20/00*     (2019.01)
    *H04L 9/40*      (2022.01)

(52) U.S. Cl.
    CPC ........ *H04L 63/0853* (2013.01); *H04L 63/102* (2013.01); *H04L 63/1408* (2013.01)

(56) References Cited

U.S. PATENT DOCUMENTS

| | | | |
|---|---|---|---|
| 8,489,635 B1 | 7/2013 | Phoha | |
| 8,606,640 B2 | 12/2013 | Brody | |
| 8,817,981 B2* | 8/2014 | Fiske | G06F 21/46 713/184 |
| 9,032,501 B1* | 5/2015 | Martin | H04W 12/35 713/169 |
| 9,203,860 B1* | 12/2015 | Casillas | H04L 63/1408 |
| 9,275,345 B1* | 3/2016 | Song | G06N 20/00 |
| 9,706,406 B1* | 7/2017 | Adams | G06F 21/32 |
| 9,747,596 B2 | 8/2017 | Brody | |
| 9,767,449 B2 | 9/2017 | Brody | |
| 9,906,954 B2 | 2/2018 | McClement | |
| 9,996,803 B2* | 6/2018 | Li | G06F 21/31 |
| 10,078,743 B1* | 9/2018 | Baldi | G06F 21/316 |
| 10,135,614 B2 | 11/2018 | Roberts | |
| 10,438,200 B1 | 10/2019 | Griffith | |
| 10,501,267 B1 | 12/2019 | Chinoy | |
| 10,531,295 B2 | 1/2020 | McClement | |
| 10,824,703 B1 | 11/2020 | Desai | |
| 10,867,025 B2 | 12/2020 | Whaley | |
| 11,159,940 B2 | 10/2021 | Richard | |
| 11,176,231 B2 | 11/2021 | Whaley | |
| 11,184,350 B2 | 11/2021 | Mainali | |
| 11,297,459 B2 | 4/2022 | Raduchel | |
| 2001/0037254 A1 | 11/2001 | Glikman | |
| 2002/0052754 A1 | 5/2002 | Joyce | |
| 2002/0143634 A1 | 10/2002 | Kumar | |
| 2003/0212601 A1 | 11/2003 | Silva et al. | |
| 2004/0083394 A1 | 4/2004 | Brebner | |
| 2004/0243477 A1 | 12/2004 | Mathai | |
| 2005/0022034 A1* | 1/2005 | Chaudhari | G06F 21/32 726/19 |
| 2005/0075945 A1 | 4/2005 | Hodge | |
| 2005/0114020 A1 | 5/2005 | Seto | |
| 2005/0262944 A1* | 12/2005 | Bennett | G01N 29/4427 73/592 |
| 2006/0161646 A1 | 7/2006 | Chene | |
| 2006/0224470 A1 | 10/2006 | Garcia Ruano | |
| 2006/0294388 A1 | 12/2006 | Abraham | |
| 2007/0027803 A1 | 2/2007 | Brandes | |
| 2007/0043664 A1 | 2/2007 | Wilkes | |
| 2007/0055623 A1 | 3/2007 | Ha | |
| 2007/0121580 A1 | 5/2007 | Forte et al. | |
| 2007/0256122 A1 | 11/2007 | Foo | |
| 2007/0288377 A1 | 12/2007 | Shaked | |
| 2007/0299728 A1 | 12/2007 | Nemirofsky | |
| 2007/0299773 A1 | 12/2007 | Soderstrom | |
| 2008/0125117 A1 | 5/2008 | Jiang | |
| 2008/0139171 A1 | 6/2008 | Bernath | |
| 2008/0140548 A1 | 6/2008 | Csoka | |
| 2009/0006254 A1 | 1/2009 | Mumm | |
| 2009/0100269 A1* | 4/2009 | Naccache | H04L 9/3271 713/186 |
| 2009/0112872 A1 | 4/2009 | Doi | |
| 2010/0042835 A1* | 2/2010 | Lee | H04W 12/065 713/168 |
| 2010/0210242 A1 | 8/2010 | Caudevilla | |
| 2010/0235276 A1 | 9/2010 | Smith | |
| 2011/0022477 A1* | 1/2011 | Hatridge | G06Q 30/02 715/745 |
| 2012/0164978 A1* | 6/2012 | Conti | H04W 12/06 455/411 |
| 2012/0197786 A1 | 8/2012 | Brown | |
| 2012/0321087 A1 | 12/2012 | Fleischman | |
| 2013/0044912 A1* | 2/2013 | Kulkarni | G06V 20/20 382/103 |
| 2013/0117181 A1 | 5/2013 | Isaacson | |
| 2013/0132717 A1 | 5/2013 | Brand et al. | |
| 2014/0101044 A1 | 4/2014 | Blackhurst | |
| 2014/0188770 A1* | 7/2014 | Agrafioti | G06F 21/316 706/13 |
| 2014/0289833 A1* | 9/2014 | Briceno | H04L 9/006 726/5 |
| 2014/0317734 A1* | 10/2014 | Valencia | G06F 21/552 726/22 |
| 2014/0372762 A1* | 12/2014 | Flautner | H04L 63/08 713/173 |
| 2015/0038120 A1 | 2/2015 | Larkin | |
| 2015/0093048 A1 | 4/2015 | Smith | |
| 2015/0135310 A1 | 5/2015 | Lee | |
| 2015/0170230 A1 | 6/2015 | Panchal | |
| 2015/0205957 A1* | 7/2015 | Turgeman | G06F 21/554 726/23 |
| 2015/0215305 A1 | 7/2015 | Wetzel et al. | |
| 2015/0242601 A1 | 8/2015 | Griffiths | |
| 2015/0312404 A1* | 10/2015 | Abramson | H04W 8/02 455/418 |
| 2015/0332031 A1* | 11/2015 | Mistry | H04W 12/06 726/19 |
| 2016/0012465 A1 | 1/2016 | Sharp | |
| 2016/0050203 A1 | 2/2016 | Hefetz | |
| 2016/0057623 A1* | 2/2016 | Dutt | H04W 12/126 455/411 |
| 2016/0103996 A1* | 4/2016 | Salajegheh | G06F 21/316 726/25 |
| 2016/0110528 A1* | 4/2016 | Gupta | H04L 63/08 726/19 |
| 2016/0180068 A1* | 6/2016 | Das | H04L 63/0861 726/7 |
| 2016/0182503 A1 | 6/2016 | Cheng | |
| 2016/0197918 A1 | 7/2016 | Turgeman | |
| 2016/0278664 A1* | 9/2016 | Pant | A61B 5/082 |
| 2016/0295512 A1 | 9/2016 | Hara | |
| 2016/0300049 A1* | 10/2016 | Guedalia | G06V 30/1985 |
| 2016/0330199 A1 | 10/2016 | Weiner | |
| 2016/0342784 A1 | 11/2016 | Beveridge | |
| 2016/0350591 A1 | 12/2016 | Kraft | |
| 2017/0061441 A1* | 3/2017 | Kamal | G06Q 20/326 |
| 2017/0063852 A1 | 3/2017 | Azar | |
| 2017/0085564 A1 | 3/2017 | Giobbi | |
| 2017/0085565 A1 | 3/2017 | Sheller | |
| 2017/0094510 A1* | 3/2017 | Khosravi | H04L 63/04 |
| 2017/0104597 A1* | 4/2017 | Negi | H04L 9/0825 |
| 2017/0193208 A1* | 7/2017 | Ashley | G06F 21/32 |
| 2017/0199588 A1 | 7/2017 | Ahn | |
| 2017/0249479 A1* | 8/2017 | Gordon | G06F 40/166 |
| 2017/0279957 A1* | 9/2017 | Abramson et al. | G06F 21/36 |
| 2017/0289168 A1* | 10/2017 | Bar | H04L 63/1408 |
| 2017/0337364 A1 | 11/2017 | Whaley | |
| 2018/0078179 A1* | 3/2018 | Deng | H04W 12/065 |
| 2018/0121921 A1 | 5/2018 | Woo | |
| 2018/0181741 A1 | 6/2018 | Whaley | |
| 2019/0245851 A1 | 8/2019 | Whaley | |
| 2019/0251534 A1 | 8/2019 | Desai | |
| 2019/0281442 A1 | 9/2019 | Kim et al. | |
| 2019/0295006 A1 | 9/2019 | Zises | |
| 2019/0325445 A1 | 10/2019 | Anderson et al. | |
| 2019/0349767 A1 | 11/2019 | Rolfe | |
| 2019/0370777 A1 | 12/2019 | Brody | |
| 2020/0092723 A1 | 3/2020 | McClement et al. | |
| 2020/0104829 A1 | 4/2020 | Arora et al. | |
| 2020/0134151 A1 | 4/2020 | Magi | |
| 2020/0162515 A1 | 5/2020 | Dubinsky | |
| 2020/0252218 A1 | 8/2020 | Wexler | |
| 2020/0258084 A1 | 8/2020 | Henderson | |
| 2020/0260258 A1 | 8/2020 | Desai | |
| 2020/0304985 A1 | 9/2020 | Gupta | |
| 2020/0342086 A1 | 10/2020 | Oung | |

(56) References Cited

U.S. PATENT DOCUMENTS

| | | | |
|---|---|---|---|
| 2020/0351818 | A1 | 11/2020 | Park |
| 2022/0004611 | A1 | 1/2022 | Whaley |
| 2022/0045852 | A1 | 2/2022 | Isshiki et al. |
| 2022/0374864 | A1 | 11/2022 | Agarwal |

FOREIGN PATENT DOCUMENTS

| | | |
|---|---|---|
| KR | 20070121618 | 12/2007 |
| KR | 20080003760 | 1/2008 |

OTHER PUBLICATIONS

PCT Application No. PCT/US2022/029852 / International Search Report and Written Opinion dated Oct. 6, 2022, 12 pages, Doc 1850.
U.S. Appl. No. 17/674,627 / Non-Final Office Action dated Nov. 10, 2022, 21 pages, Doc 1851.
U.S. Appl. No. 17/225,964 / Notice of Publication dated Oct. 13, 2022, 1 page, Doc 1852.
U.S. Appl. No. 17/674,627 / Response to Non-Final Office action dated Feb. 10, 2023, 12 pages, Doc 1884.
U.S. Appl. No. 18/188,847, filed Mar. 23, 2023, 80 pages, Doc 1885.
U.S. Appl. No. 17/225,964 / Response to Non-Final Office Action filed Nov. 23, 2022, 15 pages, Doc 1887.
U.S. Appl. No. 17/225,964 / Final Office Action dated Mar. 3, 2023, 33 pages, Doc 1886.
U.S. Appl. No. 17/410,918 / Notice of Publication dated Mar. 2, 2023, 1 page, Doc 1888.
U.S. Appl. No. 18/188,847 / Filing Receipt and Informational Notice to Applicant dated Apr. 14, 2023, 5 pages, Doc 1893.
U.S. Appl. No. 17/674,627 / Notice of Publication dated Jul. 28, 2022, 1 page, Doc 1836.
U.S. Appl. No. 17/570,335 / Notice of Publication dated Jul. 7, 2022, 1 page, Doc 1837.
U.S. Appl. No. 17/225,964 / Response to Non-Final Office Action filed Jun. 6, 2022, 11 pages, Doc 1838.
U.S. Appl. No. 17/225,964 / Non-final Office Action dated Aug. 24, 2022, 19 pages, Doc 1839.
PCT Application PCT/US2022/011725 / Demand & Response to Written Opinion filed Oct. 31, 2022, 14 pages, Doc 1876.
PCT Application PCT/US2022/023938 / PCT Application filed Apr. 7, 2022, 71 pages, Doc 1875.
PCT Application PCT/US2022/023938 / International Search Report and Written Opinion dated May 17, 2022, 11 pages, Doc 1874.
U.S. Appl. No. 16/691,490 / Issue Notification dated Mar. 16, 2022, 1 page, Doc 1815.
U.S. Appl. No. 17/674,627, filed Feb. 17, 2022, 88 pages, Doc 1816.
U.S. Appl. No. 17/674,627 / Filing Receipt and Notice to File Missing Parts dated Feb. 25, 2022, 6 pages, Doc 1817.
U.S. Appl. No. 17/674,627 / Preliminary Amendment and Response to Notice to File Missing Parts filed Apr. 14, 2022, 13 pages, Doc 1818.
U.S. Appl. No. 17/674,627 / Updated Filing Receipt dated Apr. 18, 2022, 4 pages, Doc 1819.
PCT Application PCT/US22/11725 / International Search Report and Written Opinion dated Mar. 30, 2022, 15 pages, Doc 1820.
U.S. Appl. No. 17/225,964 / Non-final Office Action dated May 2, 2022, 32 pages, Doc 1821.
U.S. Appl. No. 17/225,964 / Examiner Interview Summary dated May 27, 2022, 3 pages, Doc 1822.
U.S. Appl. No. 17/747,214, filed May 18, 2022, 63 pages, Doc 1823.
U.S. Appl. No. 17/747,214 / Filing Receipt dated May 24, 2022, 3 pages, Doc 1824.
PCT/US22/29852 / PCT Application filed May 18, 2022, 61 pages, Doc 1825.
U.S. Appl. No. 16/385,776 Issue Fee Payment and 312 Amendment filed Apr. 28, 2022, 20 pages, Doc 1826.
U.S. Appl. No. 16/385,776 / Examiner Response to 312 Amendment dated May 4, 2022, 3 pages, Doc 1827.
U.S. Appl. No. 16/385,776 / Issue Notification dated Jun. 1, 2022, 1 page, Doc 1828.
U.S. Appl. No. 17/674,627 / Terminal Disclaimer filed May 26, 2023, 5 pages, Doc 1904.
U.S. Appl. No. 17/674,627 / Notice of Allowance and Allowability dated Jun. 8, 2023, 20 pages, Doc 1905.
U.S. Appl. No. 18/188,847 / Non-Final Office Action dated Jun. 21, 2023, 22 pages, Doc 1906.
U.S. Appl. No. 18/188,847 / Notice of Publication issued Jul. 20, 2023, 1 page, Doc 1907.
U.S. Appl. No. 17/225,964 / Response to Final Office Action & AFCP Request filed May 3, 2023, 23 pages, Doc 1908
U.S. Appl. No. 17/225,964 / Advisory Action dated Jun. 2, 2023, 10 pages, Doc 1909.
U.S. Appl. No. 17/225,964 / RCE & Amendment filed Jul. 3, 2023, pp. 27, Doc 1910.
U.S. Appl. No. 17/410,918 / Non-Final Office Action dated Jun. 1, 2023, 52 pages, Doc 1911.
Anonymous, Method and Apparatus for Mobile Identity Authentication, Publication Date Mar. 29, 2010, 71 pages, Doc 1083.
"Get Real-Time Feedback From Your Customers, without the Need for an Internet Connection" USSD Notifications HTTPS://txtnation.com/mobile-messaging/USSD-notifications/, accessed Jun. 9, 2021 5 pages, Doc 1170.
Carr, "Mobile Payment Systems and Services: An Introduction", Mobile Payment Forum, 2007, 12 pages, Doc 1171.
Karnouskos et al., "Mobile Payments: A journey through Existing Procedures and Standardization Initiatives," IEEE communications Surveys and Tutorials, Fourth Quarter, vol. 6, Nov. 2004, 23 pages, Doc 1172.
Petrova, "Mobile Payment: Towards a Customer-Centric Model", Web Information Systems Engineering—WISE Workshops, Sep. 2008, 13 pages, Doc 1173.
Rahimian, et al, "MPaySmart: A Customer Centric Approach in Offering Efficient Mobile Payments," IEEE Asia-Pacific Services Computing Conference, Dec. 2008, 6 pages, Doc 1174.
Soghoian, et al "Merx: Secure and Privacy Preserving Delegated Payments," Second International Trusted Computing Conference, Apr. 2009, 23 pages, Doc 1175.
U.S. Appl. No. 14/518,765, filed Oct. 20, 2014, 86 pages, Doc 1067.
U.S. Appl. No. 14/518,765 / Filing Receipt mailed Oct. 27, 2014, 4 pages, Doc 1068.
U.S. Appl. No. 14/518,765 / Notice of Publication mailed Apr. 21, 2016, 1 page, Doc 1069.
U.S. Appl. No. 14/518,765 / Non-Final Office Action dated May 17, 2017, 49 pages, Doc 1070.
U.S. Appl. No. 14/518,765 / Response to Non-Final Office Action filed Jun. 9, 2017, 27 pages, Doc 1071.
U.S. Appl. No. 14/518,765 / Notice of Allowance dated Oct. 11, 2017, 25 pages, Doc 1072.
U.S. Appl. No. 14/518,765 / Issue Fee Payment and 312 Amendment filed Jan. 10, 2018, 27 pages, Doc 1073.
U.S. Appl. No. 14/518,765 / Amendment After Allowance Initialed by Examiner dated Jan. 16, 2018, 1 page, Doc 1074.
U.S. Appl. No. 14/518,765 / Issue Notification dated Feb. 7, 2018, 1 page, Doc 1075.
U.S. Appl. No. 15/867,630, filed Jan. 10, 2018, 101 pages, Doc 1076.
U.S. Appl. No. 15/867,630, Notice to File Missing Parts mailed Feb. 1, 2018, 3 pages, Doc 1077.
U.S. Appl. No. 15/867,630, Filing Receipt mailed Feb. 1, 2018, 3 pages, Doc 1078.
U.S. Appl. No. 15/867,630, Response to Missing Parts and Preliminary Amendment, filed Mar. 30, 2018, 22 pages, Doc 1079.
U.S. Appl. No. 15/867,630, Updated Filing Receipt mailed Apr. 3, 2018, 4 pages, Doc 1080.
U.S. Appl. No. 15/867,630, Notice of Publication mailed Jul. 12, 2018, 1 page, Doc 1081.
U.S. Appl. No. 15/867,630, Non-Final Office Action dated Oct. 11, 2018, 95 pages, Doc 1082.
U.S. Appl. No. 15/867,630, Response to Non-Final Office Action filed Feb. 11, 2019, 27 pages, Doc 1084.

(56) References Cited

OTHER PUBLICATIONS

U.S. Appl. No. 15/867,630, Final Office Action dated Apr. 18, 2019, 28 pages, Doc 1085.
U.S. Appl. No. 15/867,630, Response to Final Office Action and AFCP Request filed Jul. 18, 2019, 28 pages, Doc 1086.
U.S. Appl. No. 15/867,630, Terminal Disclaimer filed and accepted Aug. 6, 2019, 7 pages, Doc 1087.
U.S. Appl. No. 15/867,630, Notice of Allowance/Allowability dated Aug. 20, 2019, 26 pages, Doc 1088.
U.S. Appl. No. 15/867,630, Supplemental Notice of Allowability and Examiner Interview Summary dated Nov. 6, 2019, 9 pages, Doc 1089.
U.S. Appl. No. 15/867,630, Issue Fee Payment and 312 Response dated Nov. 11, 2019, 8 pages, doc 1090.
U.S. Appl. No. 15/867,630, Supplemental Notice of Allowability and Examiner Interview Summary dated Nov. 29, 2019, 10 pages, Doc 1091.
U.S. Appl. No. 15/867,630, Issue Notification dated Dec. 18, 2019, 1 page, Doc 1092.
U.S. Appl. No. 16/691,490, filed Nov. 21, 2019, 98 pages, Doc 1093.
U.S. Appl. No. 16/691,490 / Filing Receipt mailed Dec. 10, 2019, 5 pages, Doc 1094.
U.S. Appl. No. 16/691,490 / Non-final Office Action dated Aug. 6, 2020, 54 pages, Doc 1095.
U.S. Appl. No. 16/691,490 / Response to Non-final Office Action and Terminal Disclaimer dated Aug. 6, 2020, 23 pages, Doc 1096.
U.S. Appl. No. 16/691,490 / Final Office Action dated Jan. 14, 2021, 37 pages, Doc 1097.
U.S. Appl. No. 16/691,490 / Amendment and AFCP Request filed Mar. 15, 2021, 18 pages, Doc 1098.
U.S. Appl. No. 16/691,490 / Advisory Action dated Mar. 22, 2021, 4 pages, Doc 1099.
U.S. Appl. No. 16/691,490 / Request for Continued Examination and Amendment filed Apr. 14, 2021, 21 pages, Doc 1100.
U.S. Appl. No. 16/691,490 / Office Action dated May 24, 2021, 67 pages, Doc 1101.
U.S. Appl. No. 16/691,490 / Amendment filed Aug. 24, 2021, 17 pages, Doc 1102.
U.S. Appl. No. 16/691,490 / Notice of Allowance/Allowability dated Nov. 26, 2021, 18 pages, Doc 1103.
U.S. Appl. No. 16/691,490 / Request for Updated Filing Receipt filed Feb. 3, 2022, 18 pages, Doc 1104.
U.S. Appl. No. 16/691,490 / Updated Filing Receipt dated Feb. 8, 2022, 4 pages, Doc 1105.
U.S. Appl. No. 16/691,490 / Request for Corrected Filing Receipt dated Feb. 10, 2022, 26 pages, Doc 1106.
U.S. Appl. No. 16/691,490 / Corrected Filing Receipt dated Feb. 14, 2022, 4 pages, Doc 1107.
U.S. Appl. No. 16/691,490 / Issue Fee Payment and 312 Response filed Jan. 23, 2022, 6 pages, Doc 1108.
U.S. Appl. No. 63/134,914, filed Jan. 12, 2021, 67 pages, Doc 1109.
U.S. Appl. No. 17/570,335, filed Jan. 6, 2022, 65 pages, Doc 1110.
U.S. Appl. No. 17/570,335 / Filing Receipt dated Jan. 20, 2022, 4 pages, Doc 1111.
PCT Application PCT/US22/11725 / PCT Application filed Jan. 7, 2022, 61 pages, Doc 1112.
U.S. Appl. No. 17/225,964, filed Apr. 8, 2021, 77 pages, Doc 1113.
U.S. Appl. No. 17/225,964 / Filing Receipt dated Apr. 16, 2021, 3 pages, Doc 1114.
U.S. Appl. No. 63/190,668, filed May 19, 2021, 63 pages, Doc 1115.
U.S. Appl. No. 63/190,668 / Corrected Filing Receipt dated Jul. 16, 2021, 3 pages, Doc 1116.
U.S. Appl. No. 17/410,918, filed Aug. 24, 2021, 79 pages, Doc 1117.
U.S. Appl. No. 17/410,918 / Filing Receipt dated Sep. 3, 2021, 4 pages, Doc 1118.
U.S. Appl. No. 15/600,140, filed May 19, 2017, 49 pages, Doc 1119.
U.S. Appl. No. 15/600,140 / Filing Receipt dated Jun. 5, 2017, 3 pages, Doc 1120.
U.S. Appl. No. 15/600,140 / Notice of Publication dated Nov. 23, 2017, 1 page, Doc 1121.
U.S. Appl. No. 15/600,140 / Restriction Requirement dated May 24, 2019, 6 pages, Doc 1122.
U.S. Appl. No. 15/600,140 / Response to Restriction Requirement dated May 28, 2019, 11 pages, Doc 1123.
U.S. Appl. No. 15/600,140 / Non-final Office Action dated Sep. 11, 2019, 11 pages, Doc 1124.
U.S. Appl. No. 15/600,140 / Terminal Disclaimer and Response to Non-final Office Action dated Dec. 11, 2019, 19 pages, Doc 1125.
U.S. Appl. No. 15/600,140 / Final Office Action dated Jan. 7, 2020, 19 pages, Doc 1126.
U.S. Appl. No. 15/600,140 / Terminal Disclaimer, Request for Continued Examination and Amendment filed Apr. 7, 2020, 24 pages, Doc 1127.
U.S. Appl. No. 15/600,140 / Non-final Office Action dated Jun. 10, 2020, 21 pages, Doc 1128.
U.S. Appl. No. 15/600,140 / Response to Non-final Office Action dated Sep. 2, 2020, 15 pages, Doc 1129.
U.S. Appl. No. 15/600,140 / Final Office Action dated Dec. 2, 2020, 23 pages, Doc 1130.
U.S. Appl. No. 15/600,140 / Response to Final Office Action dated Dec. 28, 2020, 12 pages, Doc 1131.
U.S. Appl. No. 15/600,140 / Advisory Action dated Jan. 8, 2021, 6 pages, Doc 1132.
U.S. Appl. No. 15/600,140 / Request for Continued Examination and Amendment filed Jan. 15, 2021, 22 pages, Doc 1133.
U.S. Appl. No. 15/600,140 / Non-final Office Action dated Feb. 21, 2021, 22 pages, Doc 1134.
U.S. Appl. No. 15/600,140 / Response to Non-final Office Action filed Apr. 16, 2021, 16 pages, Doc 1135.
U.S. Appl. No. 15/600,140 / Notice of Allowance / Allowability dated Jul. 8, 2021, 16 pages, Doc 1136.
U.S. Appl. No. 15/600,140 / Issue Fee Payment and Request for Corrected Filing Receipt filed Oct. 8, 2021, 28 pages, Doc 1137.
U.S. Appl. No. 15/600,140 / Corrected Filing Receipt filed Oct. 12, 2021, 4 pages, Doc 1138.
U.S. Appl. No. 15/600,140 / Corrected Notice of Allowability dated Oct. 20, 2021, 5 pages, Doc 1139.
U.S. Appl. No. 15/600,140 / Issue Notification dated Oct. 27, 2021, 1 page, Doc 1140.
U.S. Appl. No. 17/475,191, filed Sep. 14, 2021, 61 pages, Doc 1141.
U.S. Appl. No. 17/475,191 / Filing Receipt datled Sep. 27, 2021, 4 pages, Doc 1142.
U.S. Appl. No. 17/475,191 / Notice of Publication dated Jan. 6, 2022, 1 page, Doc 1143.
U.S. Appl. No. 15/905,607, filed Feb. 26, 2018, 58 pages, Doc 1144.
U.S. Appl. No. 15/905,607 / Filing Receipt mailed Mar. 23, 2018, 4 pages, Doc 1145.
U.S. Appl. No. 15/905,607 / Notice of Publication mailed Jun. 28, 2018, 1 page, Doc 1146.
U.S. Appl. No. 15/905,607 / Issue Fee Payment filed Nov. 6, 2018, 6 pages, Doc 1147.
U.S. Appl. No. 15/905,607 / Office Action dated Nov. 14, 2019, 35 pages, Doc 1148.
U.S. Appl. No. 15/905,607 / Terminal Disclaimer and Amendment filed Feb. 14, 2020, 25 pages, Doc 1149.
U.S. Appl. No. 15/905,607 / Final Office Action dated May 14, 2020, 30 pages, Doc 1150.
U.S. Appl. No. 15/905,607 / Request for Continued Examination and Amendment filed Aug. 13, 2020, 26 pages, Doc 1151.
U.S. Appl. No. 15/905,607 / Notice of Allowance/Allowability dated Sep. 25, 2020, 22 pages, Doc 1152.
U.S. Appl. No. 15/905,607 / Issue Fee Payment filed Nov. 6, 2020, 6 pages, Doc 1153.
U.S. Appl. No. 15/905,607 / Issue Notification mailed Nov. 24, 2020, 1 Page., Doc 1154.
U.S. Appl. No. 16/385,776, filed Apr. 16, 2019, 46 pages, Doc 1155.
U.S. Appl. No. 16/385,776 / Filing Receipt mailed Apr. 30, 2019, 5 pages, Doc 1156.
U.S. Appl. No. 16/385,776 / Notice of Publication mailed Aug. 8, 2019, 1 page, Doc 1157.

(56) References Cited

OTHER PUBLICATIONS

U.S. Appl. No. 16/385,776 / Office Action dated Nov. 19, 2020, 42 Pages, Doc 1158.
U.S. Appl. No. 16/385,776 / Amendment filed Dec. 28, 2020, 22 pages, Doc 1159.
U.S. Appl. No. 16/385,776 / Final Office Action dated Mar. 29, 2021, 38 pages, Doc 1160.
U.S. Appl. No. 16/385,776 / Request for Continued Examination and Amendment filed Jun. 4, 2021, 26 pages, Doc 1161.
U.S. Appl. No. 16/385,776 / Office Action dated Sep. 15, 2021, 34 pages, Doc 1162.
U.S. Appl. No. 16/385,776 / Response to Office Action filed Dec. 15, 2021, 23 pages, Doc 1163.
U.S. Appl. No. 16/385,776 / Examiner Interview Summary dated Jan. 5, 2022, 2 pages, Doc 1164.
U.S. Appl. No. 16/385,776 / Terminal Disclaimer and Request for Corrected Filing Receipt filed Jan. 6, 2022, 26 pages, Doc 1165.
U.S. Appl. No. 16/385,776 / Notice of Allowance/Allowability dated Feb. 2, 2022, 9 pages, Doc 1166.

\* cited by examiner

IDENTIFYING AND AUTHENTICATING USERS BASED ON PASSIVE FACTORS DETERMINED FROM SENSOR DATA

CROSS-REFERENCE TO RELATED APPLICATION

This application is a continuation application of U.S. application Ser. No. 15/600,140, filed 19 May 2017, which claims the benefit of U.S. Provisional Application Ser. No. 62/338,663, entitled "Authentication and Identification System," by inventor John C. Whaley, filed on 19 May 2016, the contents of which are incorporated by reference herein in their entireties.

BACKGROUND

Field

The disclosed embodiments generally relate to techniques for identifying and authenticating users in computing systems. More specifically, the disclosed embodiments relate to a technique for identifying and authenticating a user in a computing system based on passive factors determined from sensor data.

Related Art

There presently exist a number of systems for identifying and authenticating computer system users. At present, most systems rely on knowledge-based factors, such as passwords. However, passwords have limitations, especially with respect to the user experience. Human users are simply not good at creating new passwords that include strong and unique combinations of characters that are also memorable. Furthermore, passwords are commonly phished or stolen. Moreover, the password-creation rules that websites and services enforce are ever-changing and growing increasingly complex. To keep up with this complexity, users often reuse passwords across multiple services, or make only small, predictable changes among passwords for different services. Also, because passwords are hard to remember, users often write them down or store them in a file for easy access, which also makes them easier to steal. Some users employ password managers to handle all of their passwords. However, password managers reduce security by creating a single point of failure.

Services commonly make use of other knowledge-based queries for authentication, such as asking for a user's mother's maiden name, Social Security number, or information from the user's credit report. However, this type of data is often easy to research or is susceptible to social-engineering attacks.

Some services rely on a two-factor authentication technique, which requires a user to carry an extra device in order to authenticate. However, this can be burdensome to the user because the device can be forgotten, run out of power, or break.

Some services authenticate a user based on biometric factors, such as fingerprints. However, it is often inconvenient to use such systems, and they can require specialized hardware. Moreover, it is very difficult or impossible to alter a biometric signature in case it is compromised.

Another technique is to authenticate users based on certain types of passive factors, such as cookies, IP addresses, and physical locations. In systems that employ such passive factors, users do not have to do anything additional to identify themselves. However, such passive factors can only separate users into large classes, and are generally not accurate enough to authenticate a particular user. Such techniques are too imprecise in part because they tend to focus on identifying a device, instead of identifying a specific user of the device.

Some systems allow users to employ third-party services to provide authentication. However, these third-party services have a number of drawbacks, including giving up control of authentication to a potentially competing interest, and the absence of a predominant standard for authentication and/or identity.

Hence, what is needed is a technique for identifying and authenticating users of computing systems without drawbacks of the above-described existing techniques.

SUMMARY

The disclosed embodiments relate to a system that authenticates and/or identifies a user of an electronic device based on passive factors, which do not require conscious user actions. During operation of the system, in response to detecting a trigger event, the system collects sensor data from one or more sensors in the electronic device. Next, the system extracts a feature vector from the sensor data. The system then analyzes the feature vector to authenticate and/or identify the user, wherein the feature vector is analyzed using a model trained with sensor data previously obtained from the electronic device while the user was operating the electronic device.

In some embodiments, the electronic device is a portable electronic device, and the sensor data includes movement-related sensor data caused by movement of the portable electronic device while the portable electronic device is in control of the user.

In some embodiments, the movement-related sensor data includes accelerometer data gathered while the user is walking, wherein the accelerometer data reflects a characteristic gait of the user while walking.

In some embodiments, authenticating and/or identifying the user of the electronic device involves generating a security score for the user along with an associated confidence value.

In some embodiments, if the security score does not exceed a minimum value, the system causes a challenge to be issued to the user. If the user successfully responds to the challenge, the system authenticates and/or identifies the user.

In some embodiments, extracting the features for the collected data involves using signal-processing techniques to extract the features.

In some embodiments, the model was trained using a machine-learning technique.

In some embodiments, if the user is successfully authenticated and/or identified, the system automatically communicates a username and password to a website or application, which the user is attempting to access.

In some embodiments, the trigger event comprises one of the following: a detected activity of the user; a state change associated with the electronic device; a timer-based trigger; and a broadcast trigger received by the electronic device.

In some embodiments, the one or more sensors include one or more of the following: an accelerometer; a touchscreen; a gyroscope; an inertial sensor; an ambient light sensor; an image sensor; a camera; an odor sensor; a temperature sensor; a barometric-pressure sensor; a cellular radio signal strength sensor; a Bluetooth radio signal strength sensor; a near-field communication (NFC) sensor; a network-proximity sensor; an infrared sensor; a magnetometer; a battery sensor; a force-touch measurement sensor; a multi-touch measurement sensor; a sensor in a mouse; a sensor in a trackpad; and a keyboard-timing sensor.

The disclosed embodiments relate to a system that automatically enters login credentials into a website on behalf of a user. During operation, the system detects a login form while accessing a web page on the website. In response to detecting the login form, the system attempts to authenticate the user through an alternative authentication technique. If the user is successfully authenticated, the system automatically responds to the login form by submitting previously stored login credentials for the user.

In some embodiments, if a challenge is received from the website in response to submission of the login credentials, the system automatically responds to the challenge using previously stored user information.

In some embodiments, if the user is not successfully authenticated using the alternative authentication technique, the system indicates an error and reverts to an original authentication technique.

In some embodiments, the login credentials comprise a username and a password.

In some embodiments, the system also interacts with a change-password mechanism on the website to automatically change the password for the user.

In some embodiments, the password is automatically changed each time the user accesses the website.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
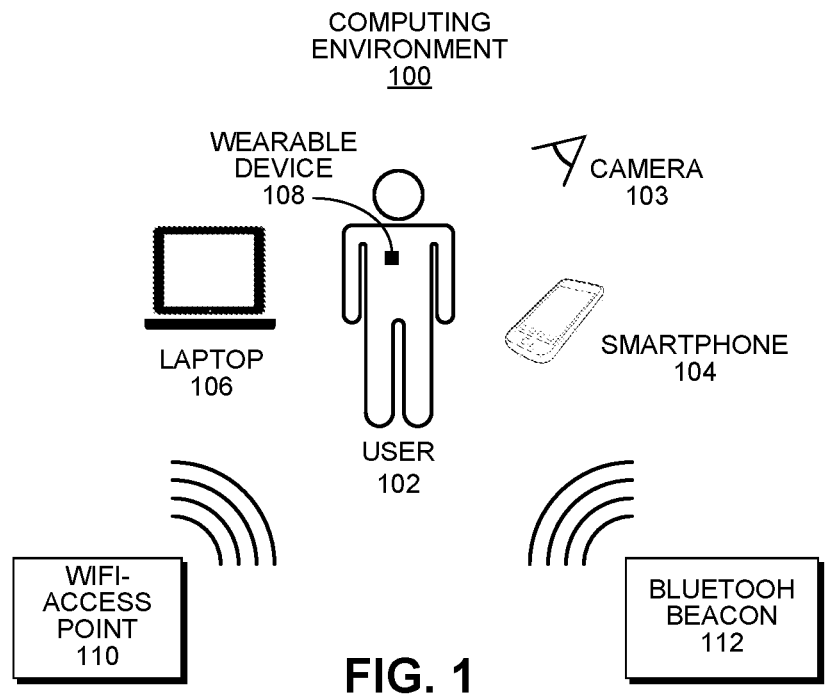
FIG. 1 illustrates various computing devices and sensors in the vicinity of a user in accordance with the disclosed embodiments.

FIG. 1 illustrates various computing devices and associated sensors that comprise a computing environment 100 for a user 102 in accordance with the disclosed embodiments. As illustrated in FIG. 1, the computing environment 100 surrounding user 102 includes a number of portable computing devices, such as a smartphone 104, or a wearable device 108, such as a fitness tracker or a smartwatch. The user 102 may also be operating a laptop computer 106 or possibly a desktop computer (not shown).

These computing devices typically include sensors that can be used to uniquely identify the user, or verify that an action is legitimately performed by the user. For example, mobile devices, such as smartphone 104, wearable device 108, a tablet computer or other personal electronic device, include sensors such as: a touchscreen; an accelerometer; a gyroscope; an inertial sensor; a virtual keyboard-timing sensor; an ambient light sensor; a camera; an odor sensor; a temperature sensor; a barometric-pressure sensor; a cellular radio signal strength sensor; a Bluetooth radio signal strength sensor; a near-field communication (NFC) sensor; an infrared sensor; a battery sensor; a force-touch measurement sensor; and a multi-touch measurement sensor. Similarly, laptop computer 106 or a desktop computer may include sensors, such as: a keyboard-timing sensor; a mouse sensor; a trackpad sensor; a Bluetooth radio signal strength sensor; an image sensor or camera; a network proximity sensor; an infrared sensor; and a battery sensor.

Computing environment 100 can include other devices with sensors, which are located in, on or near a person's body, including: medical indigestibles, subdermal implants, electronic tattoos, smart clothing or accessories, and physical authentication devices.

In addition, computing environment 100 can include other devices in the vicinity of user 102 having sensors and network connectivity, such as: a camera 103, a Wi-Fi® access point 110, a Bluetooth™ beacon 112, a home thermostat, automobile components, security systems, televisions and other entertainment devices, and IoT (Internet of Things) devices.

Note that the sensors can also provide side-channel information gleaned from measurements not necessarily designed to directly measure the element in question, such as: an accelerometer; a gyroscope; an ambient light sensor; a magnetometer; a barometer; a proximity sensor; a thermometer; and an image sensor.

Moreover, the data obtained from the sensors can be related to the interaction of multiple devices, such as: (1) the presence of different devices within wireless range or on the same local network; (2) the relative signal strength, noise, packet loss, bandwidth readings, or other statistics among multiple devices, or between a mobile device such as a mobile phone and a fixed device such as a wireless access point; (3) a combination of audio data from multiple microphones that measure ambient noise; (4) audio signals generated by playing sounds on speakers and listening for those sounds or echoes of those sounds on nearby microphones; (5) signals obtained by recording ambient light data from multiple light sensors; and (6) signals that indicate when a device is attached/paired with another device, or comes into range or communication with the other device (or when a device is detached/unpaired or goes out of range).

Also, data obtained from sensors can include semantic information about the usage of a service, such as: (1) a specific sequence of interactions with the service and the timings between the interactions; (2) when there exist multiple ways to perform a task, the particular user flow used to perform the task; (3) mistakes, typos, or misclicks, or other operations that are typically ignored by the service; (4) metadata about specific interactions, such as what part of a button or screen element was clicked, or readings from other sensors before, during, or after a significant event; and (5) responses and changes in user behavior due to perceptible or imperceptible changes in how a service is rendered or results are presented.

Exemplary Authentication Process

Prior to the authentication process taking place, the user performs a number of initialization operations, such as installing software agents on the user's devices, and importing password data from a password-management system. Next, the system learns familiar user behaviors based on information obtained from the user's devices over time to produce one or more models of the user's behaviors. After these initialization operations are complete, the system is ready to perform the authentication process.

Figure 2:
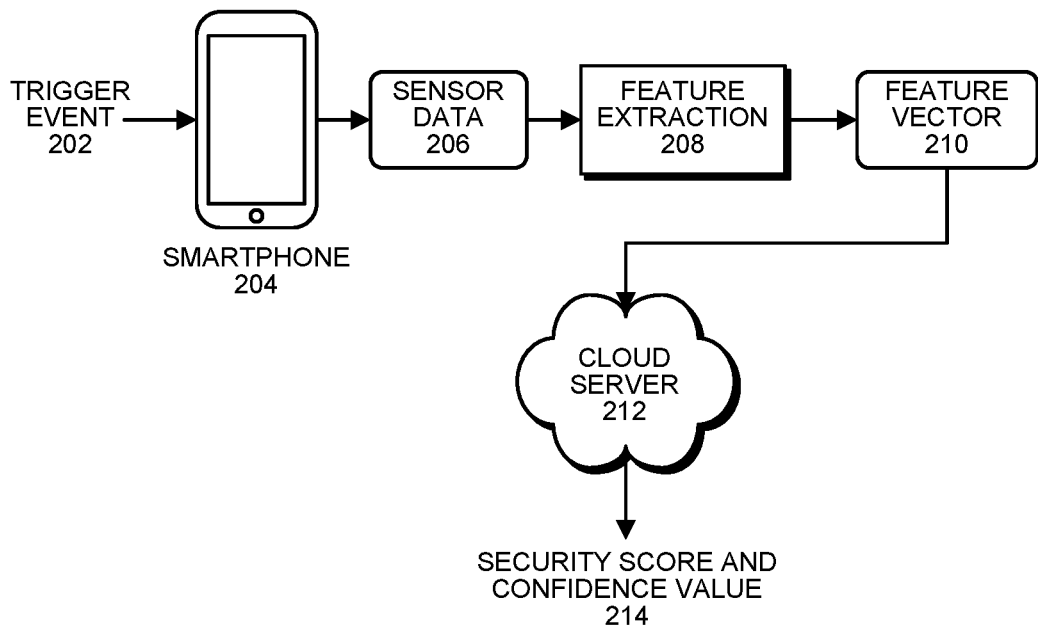
FIG. 2 illustrates an authentication process in accordance with the disclosed embodiments.

Next, as illustrated by the example in FIG. 2, the system performs the authentication process. As shown in FIG. 2, during operation of a smartphone 204, a trigger event 202 occurs, which causes an agent running on smartphone 204 to collect sensor data 206. Next, the smartphone 206 performs a feature-extraction operation 208 on the sensor data 206 to produce a feature vector 210, which is communicated to a cloud server 212. Cloud server 212 then uses a model generated through a machine-learning process to determine a security score and associated confidence value 214 for a user, wherein the security score indicates a probability that the sensor data 206 is associated with the user.

Authentication System

Figure 3:
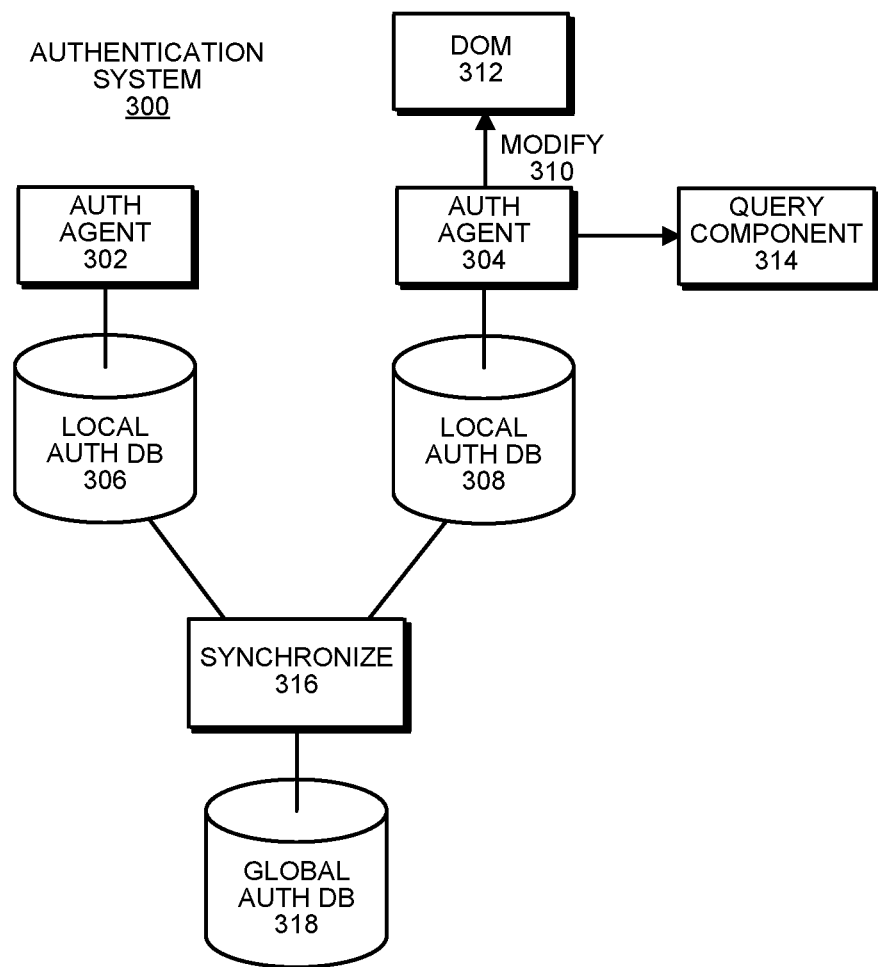
FIG. 3 illustrates how authentication agents interact with the authentication system in accordance with the disclosed embodiments.

FIG. 3 illustrates how authentication agents 302 and 304 operate in an exemplary authentication system 300 in accordance with the disclosed embodiments. Within authentication system 300, authentication agents 302 and 304 are responsible for handling integration with authentication mechanisms on various sites and services. In some embodiments, authentication agents 302 and 304 are implemented as browser plugins that control user-authentication operations that take place in associated web browsers.

For example, an authentication agent 304 in a login system can perform operations, such as modifying a document object model (DOM), structure, or look/styling of a web page, service, application, or user interface to add new login mechanisms, or to modify existing login mechanisms to facilitate automated authentication and login processes as is described in more detail below. These operations can involve: automatically interacting with user-interface elements; automatically filling in credentials; and interfacing directly with existing authentication mechanisms and interfaces. While performing these operations, authentication agent 304 can optionally hide authentication-related elements, such as usernames, passwords, forgotten-password links, and other elements so as to allow the user authentication operation to proceed without involving explicit user action.

Authentication agents 302 and 304 can also analyze the security of a user's profile and suggest actions for increasing security. For example, while analyzing a user's security profile, an authentication agent can consider: (1) the strength of the user's password with respect to dictionaries, known password leaks, password reuse, and complexity measurements; (2) an amount of information that is known about a user's behavior or environment; (3) how unique a user's behavior and environment are in comparison to those of other users; (4) the security of the user's friends or contacts; (5) the number and variety of devices that a user has registered; and (6) how many active factors have been registered for the user.

Authentication agents 302 and 304 can also enable the user to provide additional information about themselves or their devices. For example, the user can disclose familiar devices by performing: a network probe; a Bluetooth scan; an account sync; and a device-to-device sync. The user can also answer questions about themselves, and can explicitly register devices, biometrics, or any other information that will be used to respond to active or passive challenges.

The authentication agent can also use hints to discover when a device is being used by a different user, such as looking at when the user logs in to a different account, and looking for anomalous access patterns. Note that the system can possibly allow a user to authorize the use of their device(s) by one or more alternative users, which involves: ceasing collection of data for the main user; and synchronizing the alternative user's sampled data across all of the main user's accounts.

While performing authentication operations, authentication agents 302 and 304 communicate with local authentication database instances 306 and 308, respectively, which store credentials, usernames, passwords, secrets, cookies, tokens, and other secure items required for authentication. In the embodiment of the system illustrated in FIG. 3, there exists one instance of a local authentication database for each instance of an authentication agent. Moreover, the data in local authentication databases 306 and 308 can be synchronized by a synchronization module 316, so that local copies of the data are consistent with a master copy of the data stored in a global authentication database 318. For example, this synchronization process enables an encrypted password state to be synchronized across multiple devices.

Processing Sensor Data

Figure 4:
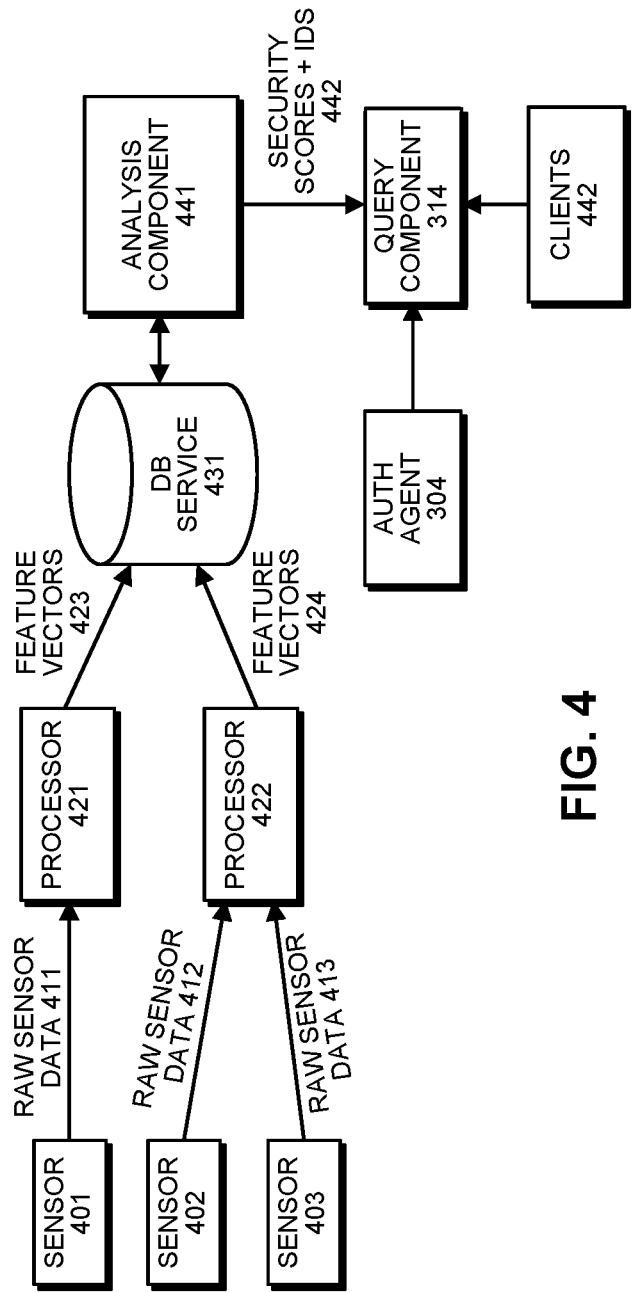
FIG. 4 illustrates how data is processed by the authentication system in accordance with the disclosed embodiments.

FIG. 4 illustrates how sensor data is processed by the authentication system in accordance with the disclosed embodiments. As illustrated in FIG. 4, the authentication system provides a query component 314 for its clients, such as authentication agent 304 and other clients 442, to query for purposes of verifying identity. Authentication agent 304 and other clients 442 can access query component 314 to verify a user's identity for a number of reasons, including logging on, checking out, and performing other secure actions.

During operation of the system illustrated in FIG. 4, sensors 401-403 collect raw sensor data 411-413 associated with a user's behavior, actions, and/or environment. Then, processors 421-422 perform signal-processing operations and other techniques on raw sensor data 411-413 to extract feature vectors. Note that processors 421-422 can be incorporated into a sensor, or can reside on a local device near the sensor, or on an entirely separate device.

Moreover, the signal-processing operations performed by processors 421-422 can include: filtering operations; conversions among the time, space and frequency domains; Fourier transforms; Butterworth filters, Z-plane analysis operations, wavelet transforms, or other operations to extract information from signals. Also, note that feature vectors 423-424 can include timestamps associated with specific sensor data collected on a per-sensor basis. Processors 421-422 can also extract encryption key bits from biometric/behavioral factors, and can combine them with other bits to form encryption keys that can be used to decrypt sensitive data. Next, processors 421-422 buffer feature vectors 423-424 and send them to database service 431, which aggregates and stores feature vectors obtained from multiple processors.

Analysis component 441 then queries database service 431 to obtain feature vectors 423-424, and performs various analysis and machine-learning operations to correlate the data and generate one or more security scores and associated identifiers 442.

Analysis component 441 uses prior data about a user obtained from database service 431 to build one or more models for the user. During this model-building process, the system can focus on characteristics of specific user behaviors to uniquely identify a user. For example, the system can examine accelerometers readings (or other sensor readings), which indicate how a user: walks, stands up, sits down, talks or types. The system can also focus on how a user manipulates her phone. One promising way to authenticate a user is to recognize the user based on accelerometer readings indicating characteristics of the user's gait while the user is walking. In fact, it is possible to recognize a specific user based on just the magnitude of the accelerometer data, and not the direction of the accelerations. The system can also consider combinations of factors from different sensors instead of merely considering a single factor. This includes considering cross-device factors, such as signal strength between a wearable device and a user's smartphone, or a combination of accelerometer readings from the wearable device and the smartphone.

The system can also attempt to detect the presence of another person, for example by looking for a Bluetooth signal from the other person's smartphone, and can condition the recognition process based on the presence or absence of the other person. This can be useful because the presence of another person may change the user's behavior.

Next, while processing the feature vectors, analysis component 441 can generate one or more possible user identities with an associated security score for each identity. Note that the system illustrated in FIG. 4 can also include a "challenge channel" (not shown) to deliver challenges to a device or a user as is discussed in more detail below.

Authentication agent 304 and other clients 442 can then connect to the query component 314 to retrieve the security score 310 for a user from analysis component 441. Query component 314 can also be used by clients to query and verify user identities continuously throughout the usage of their service. Also, instead of merely identifying and authenticating a specific user, the system can potentially be used to determine whether a user's smartphone has been stolen, or borrowed, or if another user is trying to log into a user's device on behalf of the user.

Authentication Process

Figure 5:
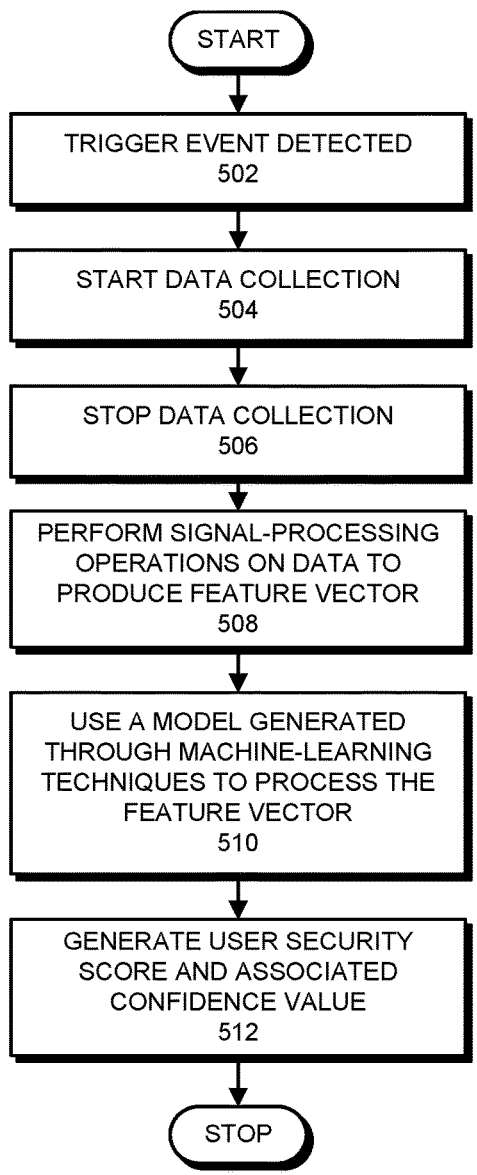
FIG. 5 presents a flow chart illustrating operations involved in the authentication process in accordance with the disclosed embodiments.

FIG. 5 presents a flow chart illustrating operations involved in the authentication process in accordance with the disclosed embodiments. First, the system detects a trigger event (step 502). As mentioned above, this trigger event can involve: detecting an activity of the user (such as detecting whether the user is walking, stationary, or driving a car); a state change associated in an electronic device belonging to a user (such as a smartphone waking up, changing its charging state, going in and out of range of a wireless access point, or moving a certain distance); a timer-based trigger; and a broadcast trigger received by the electronic device.

In response to detecting the trigger event, the system starts data collection (step 504) and sometime later stops data collection (step 506). Then, the system performs signal-processing operations on the data to produce a feature vector (step 508). The system then uses a model generated using machine-learning techniques (such as a neural network) to process the feature vector (step 510). Note that the system may generate a number of models for each user, wherein each model is associated with a specific behavior, such as walking, standing up or sitting down. The system can also generate a "universal background model," which ideally includes characteristics for the entire human race, and can determine how the user fits into the universal background model. In particular, the system can use the universal background model to identify "similar people" who exhibit characteristics, which are closest to the user, and can construct synthetic training data to train the model to discriminate between the user and the similar people.

Finally, the system generates a security score for the user along with an associated confidence value (step 512). Note that while determining the security score, the system can generate a "generalized product of experts." For example, the system can include a collection of experts, such as an expert that determines whether sensor data matches a user's gait, and another expert that determines a user's location. The system can then use inputs from all of these experts to generate the security score.

Figure 6:
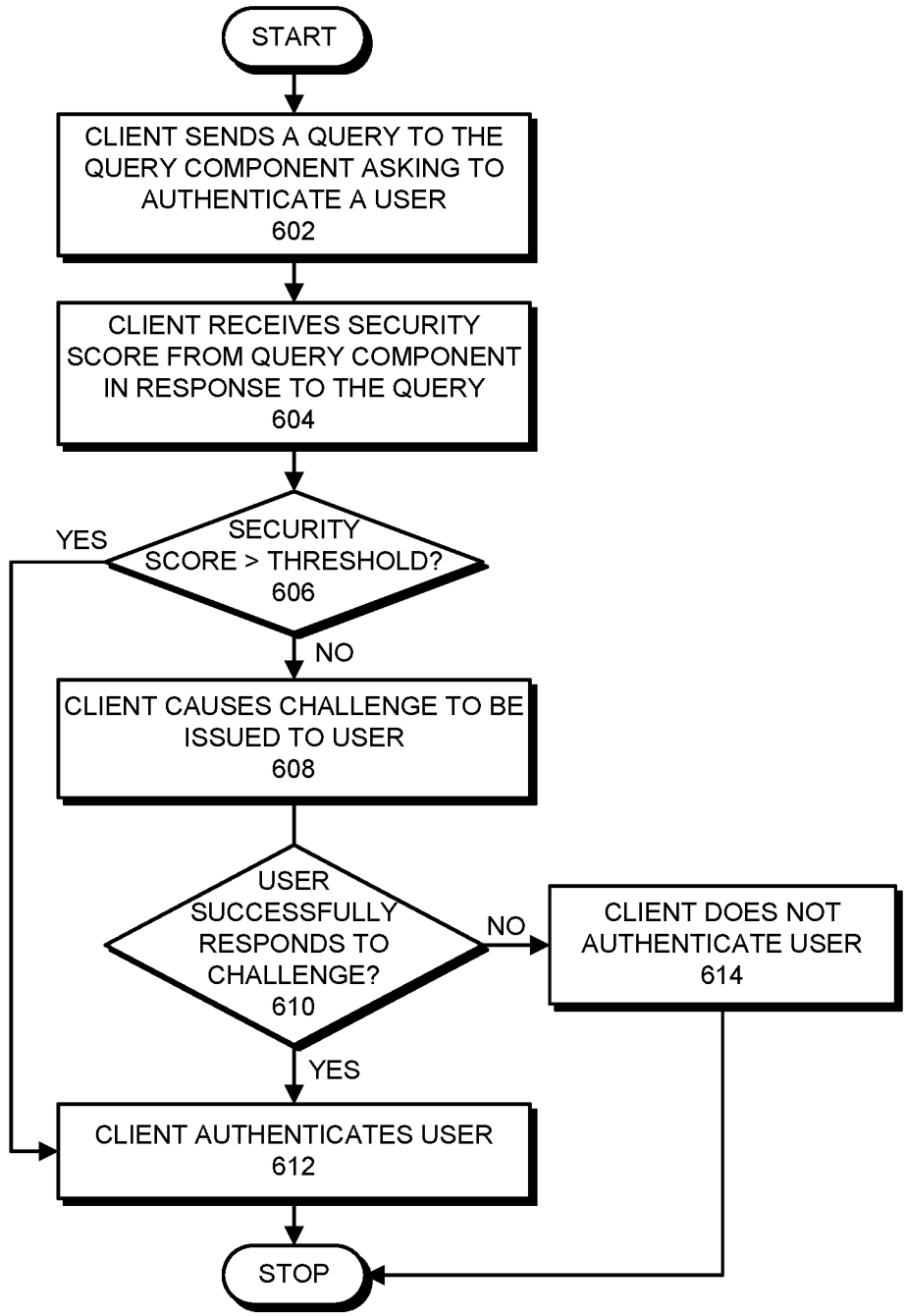
FIG. 6 presents a flow chart illustrating operations a client performs during the authentication process in accordance with the disclosed embodiments.

FIG. 6 presents a flow chart illustrating operations a client performs during the authentication process in accordance with the disclosed embodiments. First, the client sends a query to the query component asking to authenticate a user (step 602). The client then receives a security score from the query component in response to the query (step 604). Then, the system determines whether the security score is greater than a threshold (step 606). (Note that the threshold can be different for different services and actions.) If the security score is greater than the threshold (YES at step 606), the client authenticates the user (step 612). In some embodiments, this may involve combining a cryptographically signed response received from the query component with local cryptographic data to perform the authentication operation.

Otherwise, if the security score is not greater than the threshold (NO at step 606), the client causes a challenge to be issued to the user (step 608) either on the same device or on a different device. The challenge can be an "active challenge" that requires the user to perform some action, or a "passive challenge" that happens unbeknownst to the user and requires the system to obtain more-detailed sensor data or perform more-sophisticated processing of the sensor data.

A challenge can involve asking the user about a knowledge-based factor, such as asking the user to: provide a password or PIN; answer a security question; identify friends in photos; answer a question about where the user was at a particular time/date, or who was with the user, optionally with photos. A knowledge-based factor can also involve asking a user: if they took a particular photo; about credit card charges or payment activity; about emails, text messages, or other communications; about information from their social media profiles or their résumé; to identify an item in a picture; or about the user's habits, behavior, or history. Responding to a challenge can also involve using biometrics to provide authentication, which may involve obtaining: a fingerprint or other biometric reading; facial recognition; an image of the user or user's surroundings taken by a device's camera; and a voiceprint.

Responding to a challenge can also involve using additional factors to authenticate, including: a text message/email/voice call; a challenge/response to a phone app; a photo ID (holding the user's license in front of a camera); a USB unlock key; a YubiKey; a U2F key; another device with a unique ID; a one-time-use unlock code; or an NFC "bump" between a wearable device and a mobile device.

The user can also use unique behaviors to authenticate, including: signing the user's name; saying a phrase; drawing a pattern; performing a personalized motion in front of a motion-capture device; and singing or whistling.

Then, the system determines whether the user successfully responded to the challenge (step 610). If so (YES at step 610), the client authenticates the user (step 612). Otherwise, if the user does not successfully respond to the challenge (NO at step 610), the client does not authenticate the user (step 614). Also, if the security score of a user drops below or goes above the threshold, the query component can actively push notifications about the change to registered clients.

Automated Login Process

Figure 7:
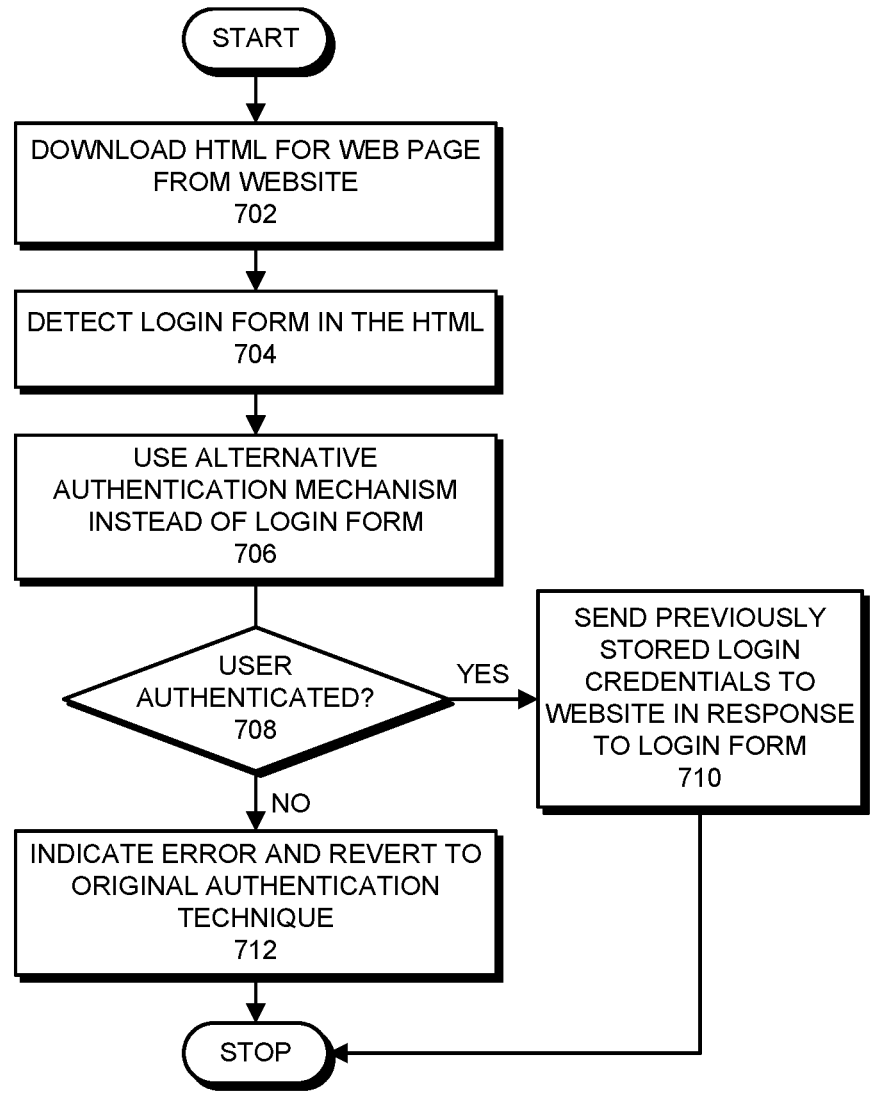
FIG. 7 presents a flow chart illustrating operations performed during an automated login process in accordance with the disclosed embodiments.

FIG. 7 presents a flow chart illustrating operations performed during an automated login process in accordance with the disclosed embodiments. First, the system downloads HTML for a web page from a website (step 702). Next, the system detects a login form in the HTML (step 704). The system then uses an alternative authentication mechanism instead of the login form (step 706). In particular, the alternative authentication mechanism can involve authenticating the user based on passive factors based on sensor data, which do not require conscious user actions. The system then determines whether the user was authenticated by the alternative login mechanism (step 708). If so (YES at step 708), the system sends previously stored login credentials (i.e., a username and a password) to the website in response to the login form (step 710). Otherwise, if the user was not successfully authenticated by the alternative login mechanism (NO at step 708), the system indicates an error and possibly reverts to the original authentication technique (step 712), which for example can involve presenting the login form to the user.

Note that the above-described automated login process provides a mechanism for an authentication system that uses passive factors to be used with a legacy website or service, which relies on passwords for authentication.

Automated Password Changing

There exist a number of reasons for changing passwords. Prior to logging in, a password may be unknown or may not work. Moreover, after logging on, it may be desirable to change a password for security reasons, because a frequently changing password is harder to compromise than a password that does not change. In fact, if the password is changed every time a user logs on, the password effectively becomes a "one-time-use" code, which is extremely secure. It may also be desirable to change a password in response to a security alert about a weakness of the current password.

The process of manually changing a password is cumbersome and can degrade the user experience. Hence, it is desirable to produce a system that automates the password-changing process. Such an automated system can operate by simulating user interactions with "forgot password" or "change password" functionality of a service, or by interacting with a "password change" or "password reset" application-programming interface (API). While performing the operations to change the password, it is also desirable to hide the operations from the user, which may involve performing the operations on a client or a server.

The automated password-change system must come up with a valid new password that obeys system-specific password rules. This can be accomplished by parsing the text of the rules, or through trial-and-error and associated parsing of resulting error messages. The new password can also be biometrically generated, for example by turning a user's walking gait into part of a cryptographic key.

During operation, the automated password-changing system must receive any challenges that arise and effectively respond to such challenges. These challenges may require a response through email, which can involve reusing existing cookies or sessions to access an email account for the user, or using the user's email credentials to access the user's email via IMAP or some other protocol. It is also desirable to be able to automatically archive or delete any email messages related to the challenge and confirmation processes. Such challenges may also involve SMS text messages, which may require an agent on a smartphone to capture and respond to text messages, and to automatically archive and/or delete challenge-related text messages. Such challenges may also involve a phone call from a service provider, which may require the system to: automatically answer the phone; wait for the call to go to voicemail; or send the call to voicemail, and subsequently access the voicemail recording. In such cases, it may be necessary to use speech-recognition technology to parse the challenge information, or to use a third-party service or an answering service to provide speech recognition.

Figure 8:
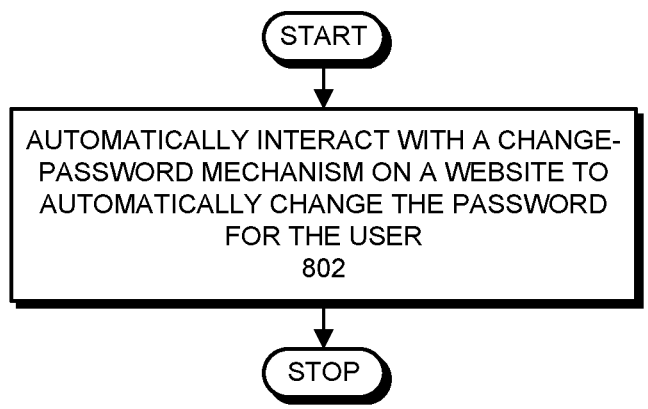
FIG. 8 presents a flow chart illustrating a process for automatically changing a password for a user in accordance with the disclosed embodiments.

In summary, FIG. 8 presents a flow chart illustrating a process for automatically changing a password for a user in accordance with the disclosed embodiments. During operation, the system interacts with a change-password mechanism on a website to automatically change the password for the user (step 802). In some embodiments, the password is automatically changed each time the user accesses the website.

Advantages

The above-described authentication techniques provide a number of advantages. For example, these authentication techniques can be used to: identify the user of a device; enable a user to securely manage identity while online; eliminate passwords and two-factor physical authentication from the user experience; utilize passive factors for seamless usability; provide a third-party authentication and user validation service; provide user-device security by notifying the user about unauthorized usage across all of the user's devices; reduce e-commerce fraud; differentiate between human users and nonhuman (bot) users; distinguish between legitimate and malicious users; allow secure messaging between individuals, regardless of the devices used; facilitate payments to a specific individual, rather than to a specific device or an account; facilitate the processing of contracts involving multiple individuals and certifications that the individuals performed certain actions; and automatically prevent fraudulent usage of a service.

The above-described authentication techniques also have advantages over existing authentication techniques because they rely on behavioral actions and other environmental data obtained from sensors in multiple sources and hence require no conscious user action. They can also eliminate the need for external authentication devices, and can facilitate automatic password resetting, rotation, and generation in the background.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method comprising:
   receiving, at an authentication system, a set of feature vectors extracted from a set of sensors of an electronic device;
   responsive to analyzing, at the authentication system, the set of feature vectors and/or a set of models of a set of behaviors of a user, determining, by the authentication system, a confidence value to indicate a likelihood that the user is in possession of the electronic device based, at least in part, on the set of feature vectors and/or the set of models;
   responsive to the electronic device encountering a login form of a third party, modifying, by the authentication system, the login form through an alteration of a document object model, a structure, a look, a styling, or a combination thereof, of the login form;
   responsive to the confidence value exceeding a threshold, authenticating, by the authentication system, the user based, at least in part, on the confidence value and the set of feature vectors and/or the set of models; and
   transmitting, by the authentication system, a set of credentials to the third party, wherein:
   the set of credentials are stored in memory, and
   the set of credentials corresponds to the user.

2. The method of claim 1, further comprising:
   receiving, at an analysis component of the authentication system, the set of feature vectors; and
   generating the set of models based, at least in part, on the set of feature vectors.

3. The method of claim 1, wherein analyzing the set of feature vectors and the set of models occurs at a server coupled to a network.

4. The method of claim 1, wherein modifying the login form comprises directing the electronic device to hide authentication-related elements displayed via the electronic device.

5. The method of claim 4, further comprising:
   directing the electronic device to display the login form responsive to the confidence value being not greater than the threshold.

6. The method of claim 5, further comprising:
   issuing a challenge to the electronic device responsive to the confidence value being not greater than the threshold.

7. The method of claim 1, further comprising an analysis component of the authentication system querying a database service to obtain parameters of the user to build the set of models.

8. The method of claim 1, wherein the set of sensors of the electronic device include one or more of the following:
   an accelerometer;
   a touchscreen;
   a gyroscope;
   an inertial sensor;
   an ambient light sensor;
   an image sensor;
   a camera;
   an odor sensor;
   a temperature sensor;
   a barometric-pressure sensor;
   a cellular radio signal strength sensor;
   a Bluetooth radio signal strength sensor;
   a near-field communication (NFC) sensor;
   a network-proximity sensor;
   an infrared sensor;
   a magnetometer;
   a battery sensor;
   a force-touch measurement sensor;
   a multi-touch measurement sensor;
   a sensor in a mouse;
   a sensor in a trackpad; and
   a keyboard-timing sensor.

9. The method of claim 8, wherein the accelerometer provides an output signal that is representative of a set of characteristics of the user's gait while the user is walking.

10. The method of claim 1, wherein the set of feature vectors is received responsive to a trigger event comprising one or more of the following:
    a detected activity of the user;
    a state change associated with the electronic device;
    a timer-based trigger; and
    a broadcast trigger received by the electronic device.

11. An apparatus, comprising:
    an authentication system computing platform, comprising at least one processor coupled to a memory device, to:
    obtain, at the authentication system computing platform, a set of feature vectors extracted from a set of sensors of an electronic device;

responsive to an analysis, at the authentication system computing platform, the set of feature vectors and/or a set of models of a set of behaviors of a user, determine, by the authentication system computing platform, a confidence value to indicate a likelihood that the user is in possession of the electronic device the set of feature vectors and/or the set of models;

responsive to the electronic device encountering a login form of a third party, modify, by the authentication system computing platform, the login form through an alteration of a document object model, a structure, a look, a styling, or a combination thereof, of the login form;

responsive to the confidence value exceeding a threshold, authenticate, by the authentication system computing platform, the user based, at least in part, on the confidence value and the set of feature vectors and/or the set of models; and transmit, by the authentication system computing platform, a set of credentials to the third party, wherein:

the set of credentials are stored in the memory device, and the set of credentials correspond to the user.

12. The apparatus of claim 11, wherein the authentication system computing platform is additionally to:
receive, at an analysis component, the set of feature vectors; and
generate the set of models based, at least in part, on the set of feature vectors.

13. The apparatus of claim 11, wherein the authentication system computing platform is additionally to:
analyze the set of feature vectors and the set of models to determine the confidence value.

14. The apparatus of claim 11, wherein the authentication system computing platform is additionally to:
direct the electronic device to hide authentication-related elements displayed via the electronic device.

15. The apparatus of claim 14, wherein the authentication system computing platform is additionally to:
direct the electronic device to display the login form responsive to the confidence value being not greater than the threshold.

16. The apparatus of claim 15, wherein the authentication system computing platform is additionally to:
issue a challenge to the electronic device responsive to the confidence value being not greater than the threshold.

17. The apparatus of claim 11, wherein the authentication system computing platform is additionally to:
query a database service to obtain parameters of the user to build the set of models.

18. The apparatus of claim 11, wherein the authentication system computing platform is additionally to obtain representations of output signals from one or more of the following:
an accelerometer;
a touchscreen;
a gyroscope;
an inertial sensor;
an ambient light sensor;
an image sensor;
a camera;
an odor sensor;
a temperature sensor;
a barometric-pressure sensor;
a cellular radio signal strength sensor;
a Bluetooth radio signal strength sensor;
a near-field communication (NFC) sensor;
a network-proximity sensor;
an infrared sensor;
a magnetometer;
a battery sensor;
a force-touch measurement sensor;
a multi-touch measurement sensor;
a sensor in a mouse;
a sensor in a trackpad; and
a keyboard-timing sensor.

19. The apparatus of claim 18, wherein the accelerometer is to provide an output signal that is representative of one or more characteristics of the user's gait while the user is walking.

20. The apparatus of claim 11, wherein the set of feature vectors is received responsive to a trigger event comprising one of the following:
a detected activity of the user;
a state change associated with the electronic device;
a timer-based trigger; and
a broadcast trigger received by the electronic device.

* * * * *